(12) United States Patent
Guo et al.

(10) Patent No.: US 11,171,675 B1
(45) Date of Patent: Nov. 9, 2021

(54) SWITCH-LESS CONNECTION FOR RADIO-FREQUENCY (RF) TRANSCEIVERS

(71) Applicant: Hong Kong Applied Science and Technology Research Institute Company, Limited, Hong Kong (HK)

(72) Inventors: Huimin Guo, Hong Kong (HK); Yujian Han, Hong Kong (HK); Yat Tung Lai, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 0 days.

(21) Appl. No.: 17/203,998

(22) Filed: Mar. 17, 2021

(51) Int. Cl.
*H04B 1/04* (2006.01)
*H04B 1/12* (2006.01)
*H04B 1/16* (2006.01)

(52) U.S. Cl.
CPC ............. *H04B 1/0483* (2013.01); *H04B 1/12* (2013.01); *H04B 1/163* (2013.01); *H04B 2001/0491* (2013.01)

(58) Field of Classification Search
CPC ........ H04B 1/0483; H04B 1/163; H04B 1/12; H04B 2001/0491
See application file for complete search history.

(56) References Cited

U.S. PATENT DOCUMENTS

| | | | |
|---|---|---|---|
| 7,417,515 B2 | 8/2008 | Chominski | |
| 8,208,866 B2 | 6/2012 | Mikhemar et al. | |
| 8,229,367 B2 | 7/2012 | Chan et al. | |
| 8,897,722 B2 | 11/2014 | Mikhemar et al. | |
| 9,203,455 B2 | 12/2015 | Yang et al. | |
| 9,385,625 B1* | 7/2016 | Kwong | H02M 7/103 |
| 9,484,977 B2 | 11/2016 | Anderson et al. | |
| 2014/0120852 A1* | 5/2014 | Ashizuka | H04B 1/0458 455/127.1 |
| 2016/0006475 A1* | 1/2016 | Chen | H04B 1/48 455/83 |
| 2017/0077984 A1* | 3/2017 | Esmaeilzadeh Najari | H04B 1/48 |
| 2017/0244442 A1* | 8/2017 | Mizokami | H03H 7/0153 |
| 2021/0152138 A1* | 5/2021 | Feng | H03F 3/45475 |

* cited by examiner

*Primary Examiner* — Dac V Ha
(74) *Attorney, Agent, or Firm* — Stuart T. Auvinen; gPatent LLC (57) ABSTRACT

A switch-less transceiver has parallel LC resonances that act as OFF switches and series LC resonances act as ON switches when resonating at the transmit (TX) or receive (RX) frequency. When the transmitter is disabled, no current flows through series LC filters. Instead, series impedances to ground provide an RF ground to the transmitter output node. A TX inductor between the transmitter output node and the antenna is in parallel with a TX blocking capacitor to ground, which together form a parallel resonance to ground that has a high impedance when resonating at the receiver frequency. This high impedance acts as an OFF switch to block antenna signals from entering the transmitter. The two paths are in parallel, presenting a high impedance to the antenna and forming an OFF switch when the receiver is disabled.

20 Claims, 7 Drawing Sheets

FIG. 1

PRIOR ART

SWITCH-LESS CONNECTION FOR RADIO-FREQUENCY (RF) TRANSCEIVERS

FIELD OF THE INVENTION

This invention relates to Radio-Frequency (RF) transceivers, and more particularly to switchless transceivers using LC resonance for switching.

BACKGROUND OF THE INVENTION

Transceivers have both a receiver and a transmitter that can operate at separate times (half-duplex) or at the same time (full-duplex). Transceivers are widely used in various communication systems, such as for wireless communications using Radio-Frequency (RF) signals.

Figure 1:
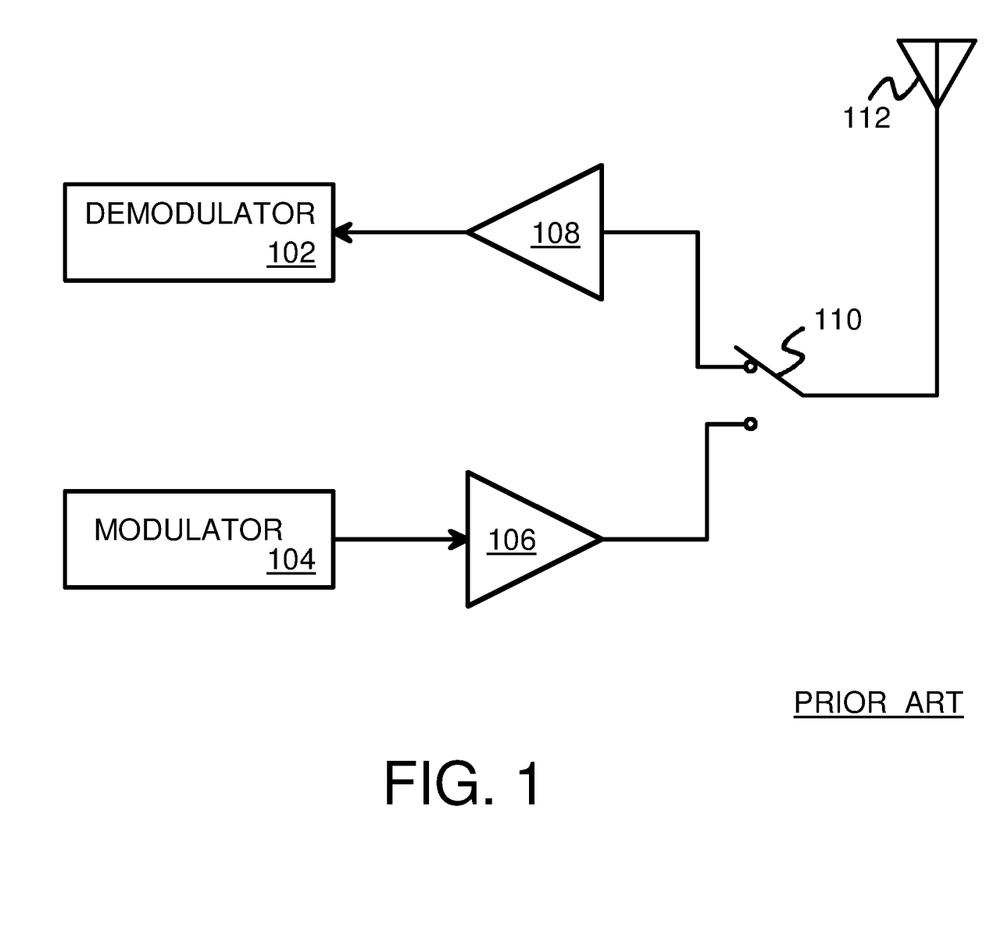
FIG. 1 is a prior art transceiver with a transmit/receive switch.

FIG. 1 is a prior art transceiver with a transmit/receive switch. Modulator 104 uses data to be transmitted to modulate a signal such as carrier wave to generate a transmitted data signal. Power amplifier 106 amplifies the modulated data signal to a strength that is sufficient to drive antenna 112 that will generate a Radio-Frequency signal that can reach remote receiver antennas.

Antenna 112 can receive RF signals that are routed through switch 110 to low-noise amplifier 108. Demodulator 102 extracts data from the amplified signal from low-noise amplifier 108 to recover the data received by antenna 112 from a remote transmitter.

Switch 110 connects antenna 112 to low-noise amplifier 108 for receive (RX) operation, and connects antenna 112 to power amplifier 106 for transmit (TX) operation. Without switch 110 present, matching for the receiver can be affected, and the output of power amplifier 106 may draw too much parasitic current from antenna 112, or otherwise disturb the accurate operation of low-noise amplifier 108. During TX operation, if switch 110 were not present, the larger transmit current from power amplifier 106 could damage the sensitive input to low-noise amplifier 108.

Switch 110 can cause an insertion loss that is undesirable. Receiver sensitivity and transmitter power can be reduced due to this insertion loss. Also, switch 110 increases cost, size, and power consumption. Thus switch 110 is undesirable.

Some transceivers have switch 110 integrated on-chip with other transceiver components. Such integration can reduce but not eliminate insertion loss. This can be acceptable for low-frequency operation, but at higher frequencies the switch insertion loss is problematic and still undesirable.

What is desired is a transceiver without a TX/RX switch to the antenna. A switchless transceiver that can operate at high frequencies is desirable. A switchless transceiver with a low insertion loss is further desirable.

DETAILED DESCRIPTION

The present invention relates to an improvement in switchless transceivers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 2:
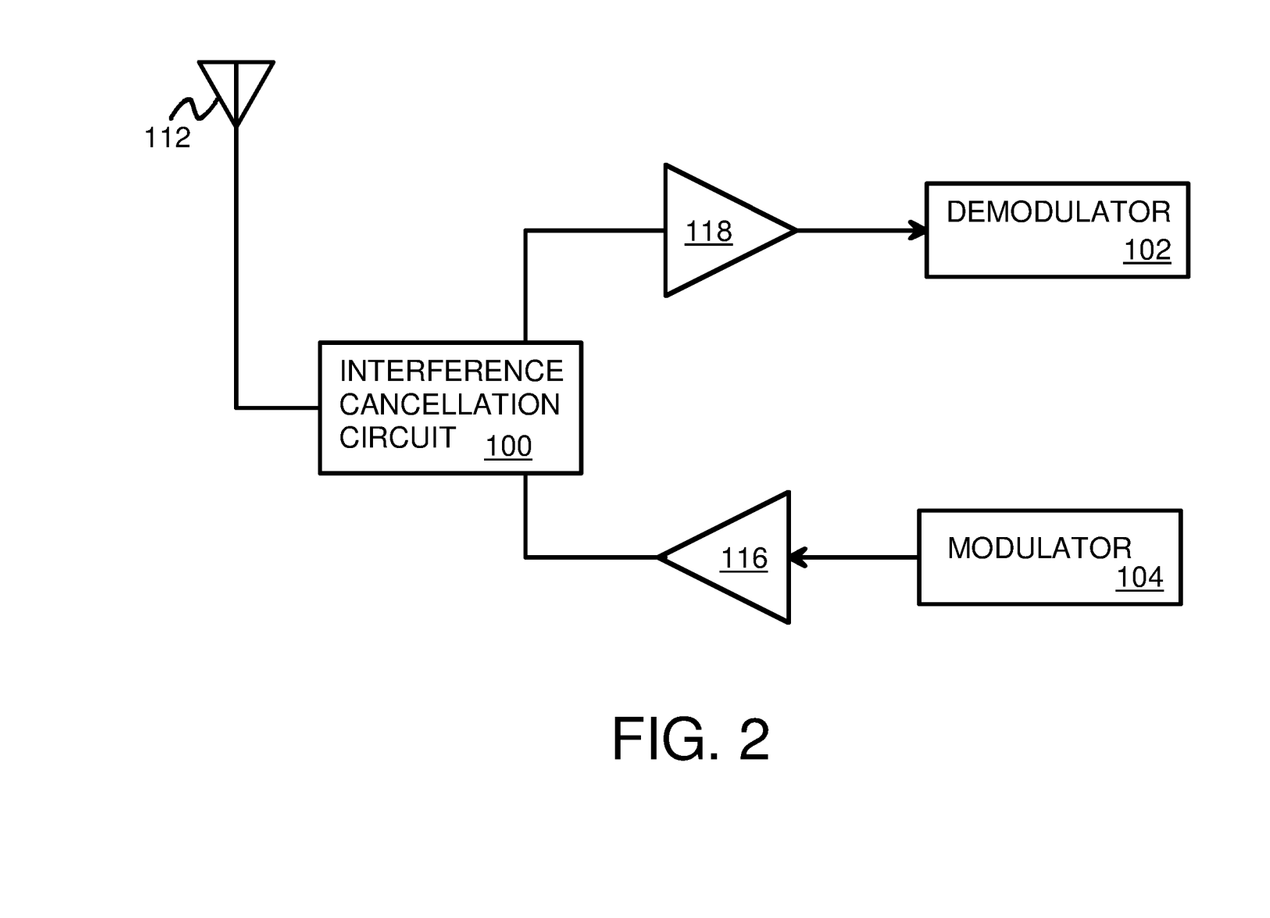
FIG. 2 shows a switchless transceiver using an interference cancellation circuit.

FIG. 2 shows a switchless transceiver using an interference cancellation circuit. Antenna 112 receives transmit data signals modulated by modulator 104 and amplified by power amplifier 112 through interference cancellation circuit 100. Interference cancellation circuit 100 also allows signals received from antenna 112 to reach low-noise amplifier 118 and be demodulated by demodulator 102.

Interference cancellation circuit 100 replaces switch 110 to provide path selection. Size, cost, and power consumption can be reduced.

Interference cancellation circuit 100 uses LC resonant circuits to provide high impedance to block signals. The resonant frequency of the LC resonant circuits is about the same as the transmit and receive frequency. However, the LC resonant frequency does not have to exactly match the transmitter (TX) and receiver (RX) frequency, since signal attenuation occurs over a range of frequencies near the peak resonant frequency.

Interference cancellation circuit 100 contains a network of inductors (L) and capacitors (C) in both parallel and series combinations. When the circuit is operating at or near the resonant frequency, a series LC combination acts as a low-impedance path, allowing the resonant-frequency signal to pass through. A parallel LC combination provides a high-impedance obstacle to resonant-frequency signals.

The inventors have realized that a serial resonance acts like a switch turned ON, while a parallel resonance acts like a switch turned OFF. The inventors have combined serial LC resonances and parallel LC resonances to act as a TX/RX switch to a RF antenna. The receiver is blocked by a parallel resonance when the transmitter is operating, and the transmitter is blocked by a parallel resonance when the receiver is operating. Series resonances provide a low-impedance path from the antenna for the receiver when receiving data. Likewise, series resonances between the transmitter and antenna provide low-impedance paths for transmit data.

Figure 3:
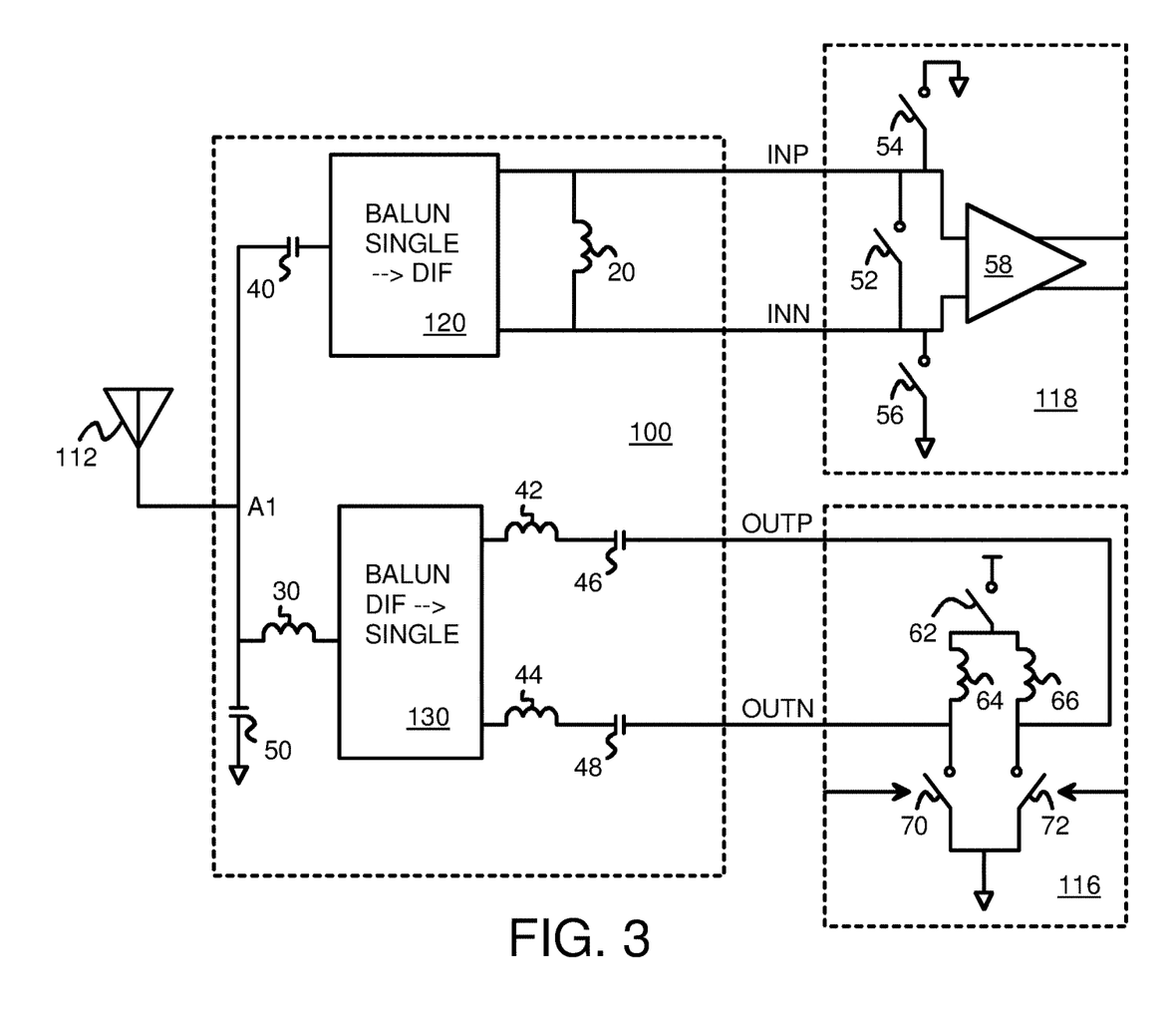
FIG. 3 is a schematic of an interference cancellation circuit between an antenna and transit and receive amplifiers.

FIG. 3 is a schematic of an interference cancellation circuit between an antenna and transit and receive amplifiers. Interference cancellation circuit 100 includes RX balun 120 that converts the single-ended signal from antenna 112 to the differential receiver inputs INP, INN to low-noise amplifier 118 in the receiver. The differential transmit signals OUTP, OUTN from power amplifier 116 in the transmitter also pass through interference cancellation circuit 100 and are converted by TX balun 130 to a single-ended signal to apply to antenna 112.

Equalizing inductor 20 equalizes the INP, INN differential inputs to low-noise amplifier 118. Switches 52, 54, 56 close to disable differential amplifier 58 and remain open during receive mode. RX capacitor 40 couples node A1 from antenna 112 to the single-ended input to RX balun 120.

Filter inductor 42 and filter capacitor 46 are in series to filter power amplifier 116 output OUTP to the positive differential input to TX balun 130. Similarly, filter inductor 44 and filter capacitor 48 are in series to filter power amplifier 116 output OUTN to the negative differential input to TX balun 130. These inductance and capacitance values can be selected to pass the desired transmit frequency and attenuate other frequencies.

Power amplifier 116 can be disabled by opening source switch 62, blocking current flow through source inductors 64, 66 to OUTN, OUTP and differential data switches 70, 72 that are controlled by the transmit data.

The single-ended output of TX balun 130 drives antenna 112 through TX inductor 30 to antenna node A1. TX blocking capacitor 50 connects node A1 to ground. During receive mode, when power amplifier 116 is disabled, TX balun 130 provides a low-impedance path to ground from the single-ended output, causing TX inductor 30 to act as a grounded capacitor.

This parallel connection of TX blocking capacitor 50 and TX inductor 30 from antenna node A1 to ground acts as a high impedance at the resonant frequency of the receiver when power amplifier 116 is disabled and the single-ended output of TX balun 130 is a virtual ground. This high impedance of the parallel connected TX blocking capacitor 50 and TX inductor 30 reduces losses from antenna node A1 and thus improves the signal to the receiver.

Figure 4:
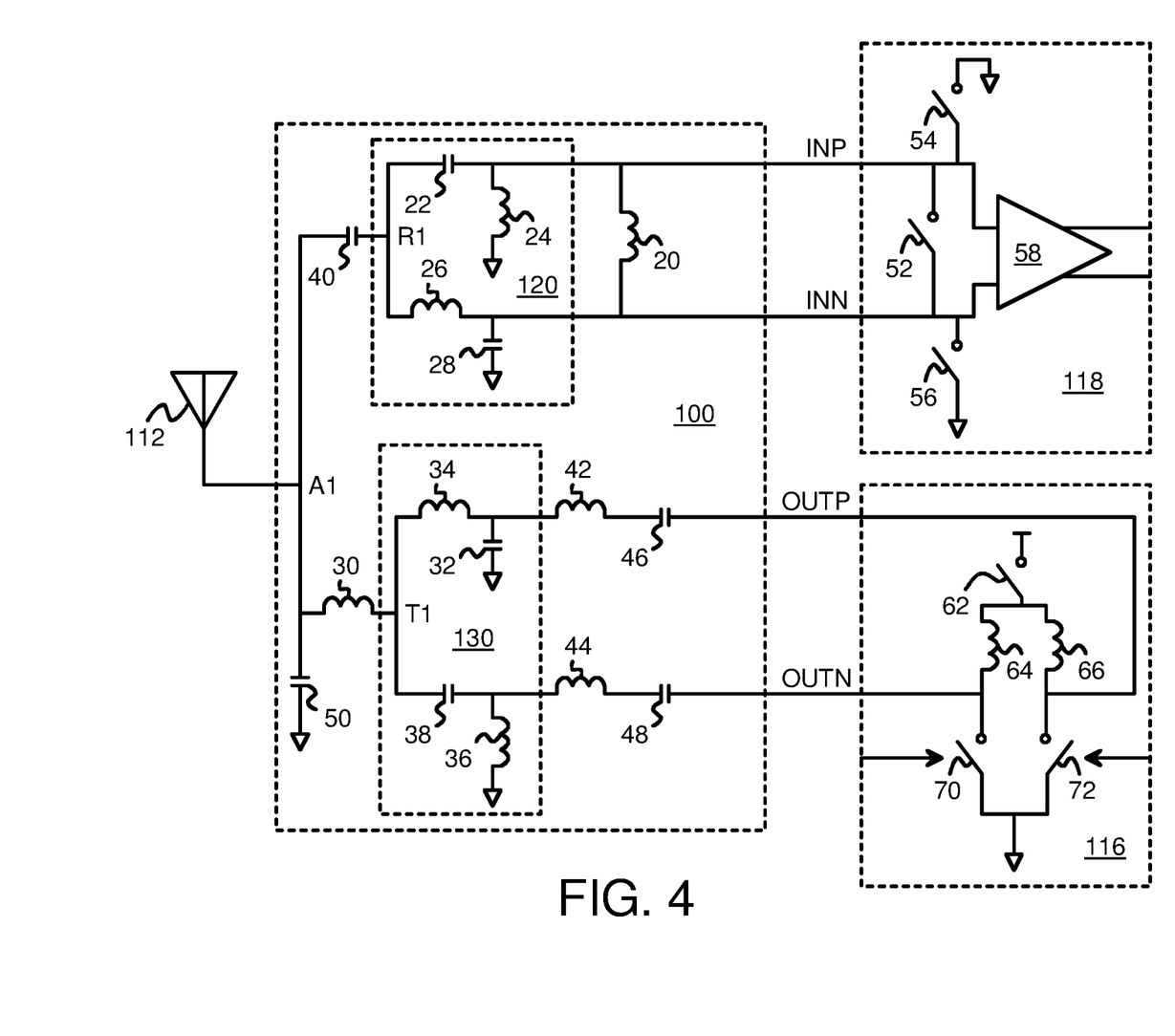
FIG. 4 is a more detailed schematic of the interference cancellation circuit between the antenna and transit and receive amplifiers.

FIG. 4 is a more detailed schematic of the interference cancellation circuit between the antenna and transit and receive amplifiers. Interference cancellation circuit 100 includes RX balun 120 that converts the single-ended signal on node R1 from antenna 112 to the differential receiver inputs INP, INN.

RX balun 120 includes RX balun series capacitor 22 connected between single-ended input node R1 and differential input INP. RX balun grounding inductor 24 is connected between INP and ground.

RX balun series inductor 26 connects single-ended input node R1 to differential input INN. RX balun grounding capacitor 28 is connected between INN and ground. RX balun series capacitor 22 and RX balun grounding inductor 24 provide a +90 degree phase shift of the input signal at R1. RX balun series inductor 26 and RX balun grounding capacitor 28 provide a −90 degree phase shift of the input signal at R1. When receiver enable switches 52, 54, 56 are closed, INP and INN are grounded and then RX balun series capacitor 22 and RX balun series inductor 26 form a parallel resonance. Therefore R1 is a high impedance node.

TX balun 130 has a first series impedance path to ground through TX balun series inductor 34 and TX balun grounding capacitor 32, and a second series impedance path to ground through TX balun series capacitor 38 and TX balun grounding inductor 36. When the transmitter is operating, series inductor 34 connects OUTP filtered by filter inductor 42 and filter capacitor 46 to transmitter output node T1, while TX balun series capacitor 38 connects OUTN filtered by filter inductor 44 and filter capacitor 48 to transmitter output node T1. The high and low signals from OUTP, OUTN are filtered and then combined at transmitter output node T1 and pass through TX inductor 30 to drive antenna node A1 and antenna 112.

Figure 5:
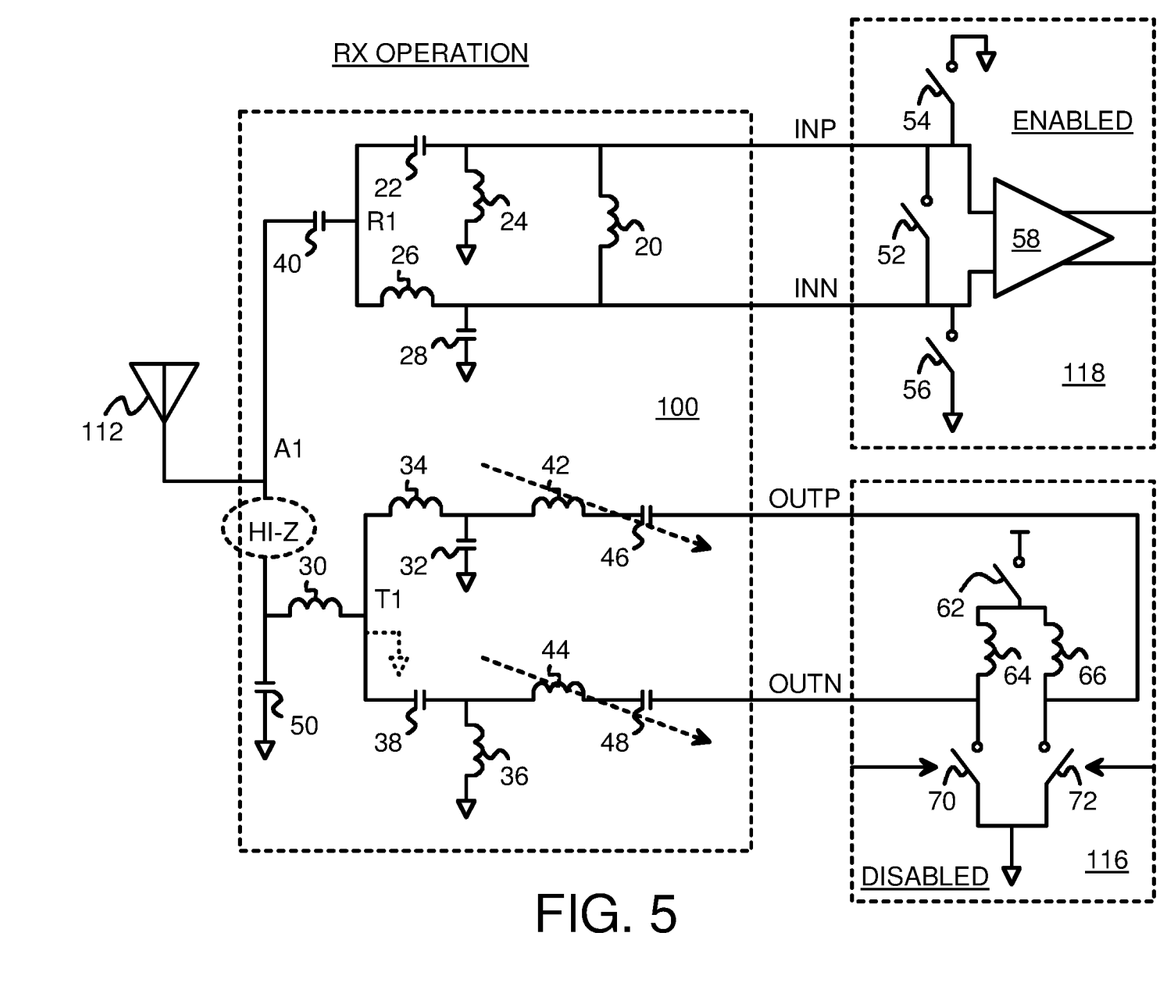
FIG. 5 highlights receive mode when the interference cancellation circuit provides a high impedance to the antenna from the transmitter output.

FIG. 5 highlights receive mode when the interference cancellation circuit provides a high impedance to the antenna from the transmitter output.

When power amplifier 116 is disabled by opening source switch 62, no current can flow from power amplifier 116 through OUTP to filter inductor 42 and filter capacitor 46. Therefore filter inductor 42 and filter capacitor 46 do not affect operation and can be removed from the circuit analysis. Likewise, no current can flow from power amplifier 116 through OUTN to filter inductor 44 and filter capacitor 48. Therefore filter inductor 44 and filter capacitor 48 do not affect operation and can be removed from the circuit analysis.

At or near the receiver frequency, the series impedances of TX balun series inductor 34 and TX balun grounding capacitor 32 resonate and provide a low impedance path to ground, or a RF or virtual ground. Also, the series impedances of TX balun series capacitor 38 and TX balun grounding inductor 36 resonate and provide a second low impedance connection to ground. Thus transmitter output node T1 is connected to a RF ground by the series impedances when power amplifier 116 is disabled.

The virtual ground of transmitter output node T1 causes TX inductor 30 to connect to virtual ground. Since TX blocking capacitor 50 is connected to ground, TX inductor 30 and TX blocking capacitor 50 are in parallel between antenna node A1 and ground or virtual ground. This parallel connection of TX inductor 30 and TX blocking capacitor 50 acts as a parallel impedance at the resonant frequency.

When the inductance and capacitance values of TX inductor 30 and TX blocking capacitor 50 are selected to have a resonant frequency of about the receiver frequency, when the receiver is operating a parallel frequency resonation builds up on TX inductor 30 and TX blocking capacitor 50 to present a very high impedance to antenna node A1. The parallel impedances of TX inductor 30 and TX blocking capacitor 50 provide a high impedance (high-Z) to antenna node A1, blocking signals received by antenna 112 from entering the transmitter. Most of the received energy from antenna 112 is sent into the receiver since the high-Z presented by TX inductor 30 and TX blocking capacitor 50 reduces losses.

The received signal from antenna 112 is forced by the high-Z of the parallel impedance of TX inductor 30 and TX blocking capacitor 50 into RX capacitor 40 and then to receiver input node R1.

Received signals from antenna 112 can pass through low-impedance paths of serial LC components, such as RX capacitor 40 and series capacitor 22 to differential input INP to low-noise amplifier 118. Antenna 112 signals on node A1 can also pass through RX capacitor 40 and series inductor 26 to differential input INN to low-noise amplifier 118.

RX balun 120 uses RX balun series capacitor 22 and RX balun series inductor 26 to convert the single-ended signal from receiver node R1 into differential signals INP, INN. Receiver enable switches 52, 54, 56 are open, allowing differential amplifier 58 to amplify the differential signal on INP, INN to generated the amplified received signal that can be further processed by downstream blocks in the receiver (not shown).

RX capacitor 40 provides AC coupling to RX balun 120. Common-mode inductor 20 between differential inputs INP, INN equalizes input signals. RX balun grounding inductor 24 and RX balun grounding capacitor 28 provide phase separation of the differential signals INP, INN by phase-shifting by +/−90 degrees.

Figure 6:
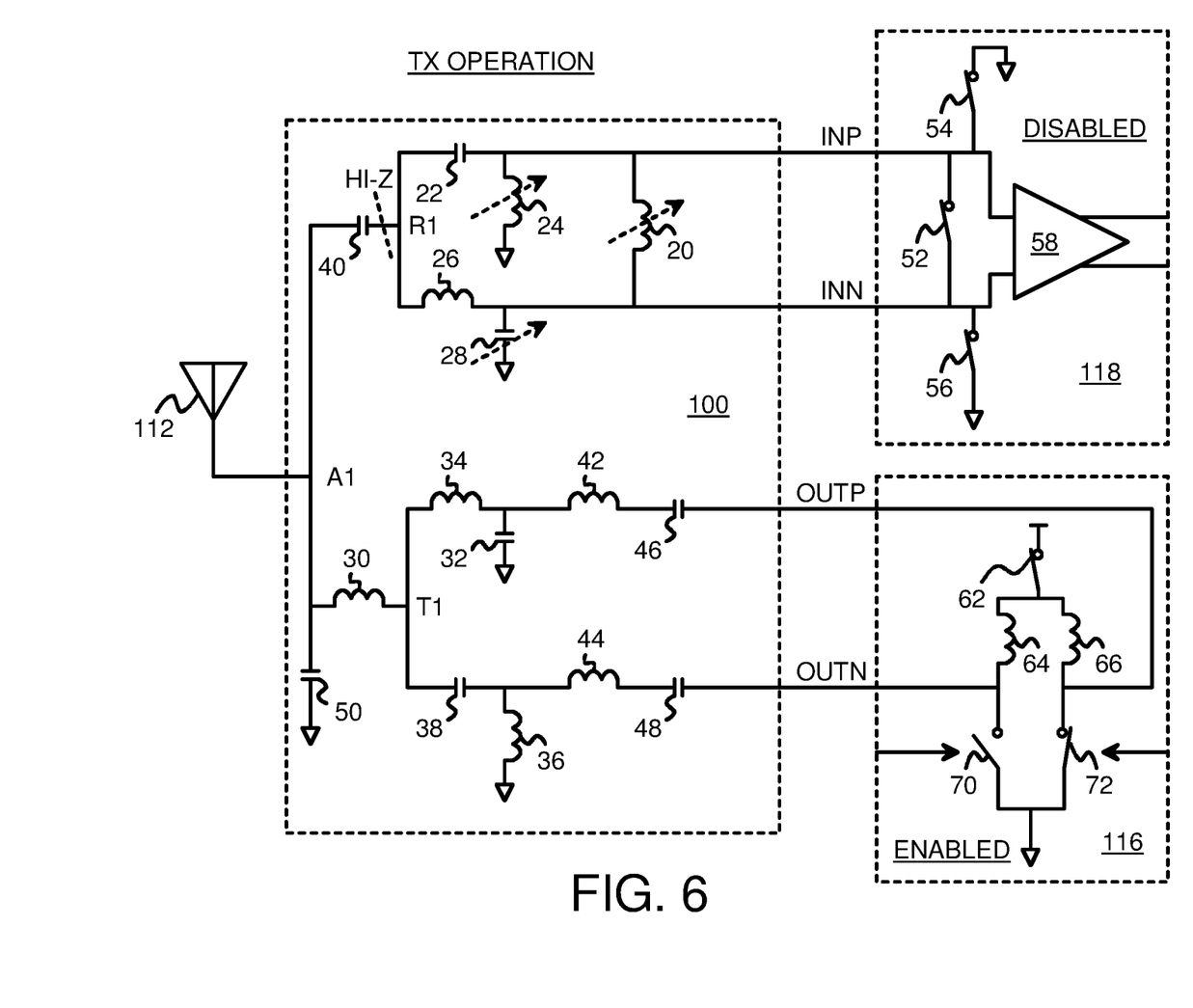
FIG. 6 highlights transmit mode when the interference cancellation circuit provides a high impedance to the antenna from the receiver input.

FIG. 6 highlights transmit mode when the interference cancellation circuit provides a high impedance to the antenna from the receiver input.

The receiver is disabled by closing receiver enable switches 52, 54, 56, driving INP and INN to ground. Since RX balun grounding inductor 24, RX balun grounding capacitor 28, and equalizing inductor 20 all have both terminals shorted to ground by the closed receiver enable switches 52, 54, 56, they are effectively eliminated from affecting circuit operation when the receiver is disabled.

RX balun series capacitor 22 and RX balun series inductor 26 are in parallel and form a parallel resonance that resonates near the transmit frequency. As the resonation builds up on RX balun series capacitor 22 and RX balun series inductor 26, a high impedance is presented through RX capacitor 40 to antenna node A1. This high impedance created at node R1 by the parallel resonance of RX balun series capacitor 22 and RX balun series inductor 26 blocks the transmitter signal from entering the receiver.

Thus the transmitter signal is not degraded by the receiver when the receiver is disabled.

When the transmitter is enabled, source switch 62 is closed to provide power to source inductors 64, 66 that source current to differential data switches 70, 72, respectively. Differential signals representing transmit data applied to the gates of differential data switches 70, 72 are amplified to drive differential signal OUTP, between source inductor 64 and differential data switch 70, and to drive differential signal OUTN, between source inductor 66 and differential data switch 72.

OUTP passes through the series impedance of filter capacitor 46 and filter inductor 42, and then through TX balun series inductor 34 and TX inductor 30 to drive antenna 112. Similarly, OUTN passes through the series impedance of filter capacitor 48 and filter inductor 44, and then through TX balun series capacitor 38 and TX inductor 30 to also drive antenna 112.

Filter inductor 42, filter capacitor 46, filter inductor 44, and filter capacitor 48 act as a filter for power amplifier 116 and provide a very low impedance for transmit signals near the resonant frequency. TX balun series inductor 34, TX balun grounding capacitor 32, TX balun series capacitor 38, and TX balun grounding inductor 36 form an LC balun for converting between differential and single-ended signals. One of the differential signals is shifted by +90 degrees while the other differential signal is shifted by −90 degrees by the LC balun of TX balun 130 at the transmit frequency.

Figure 7:
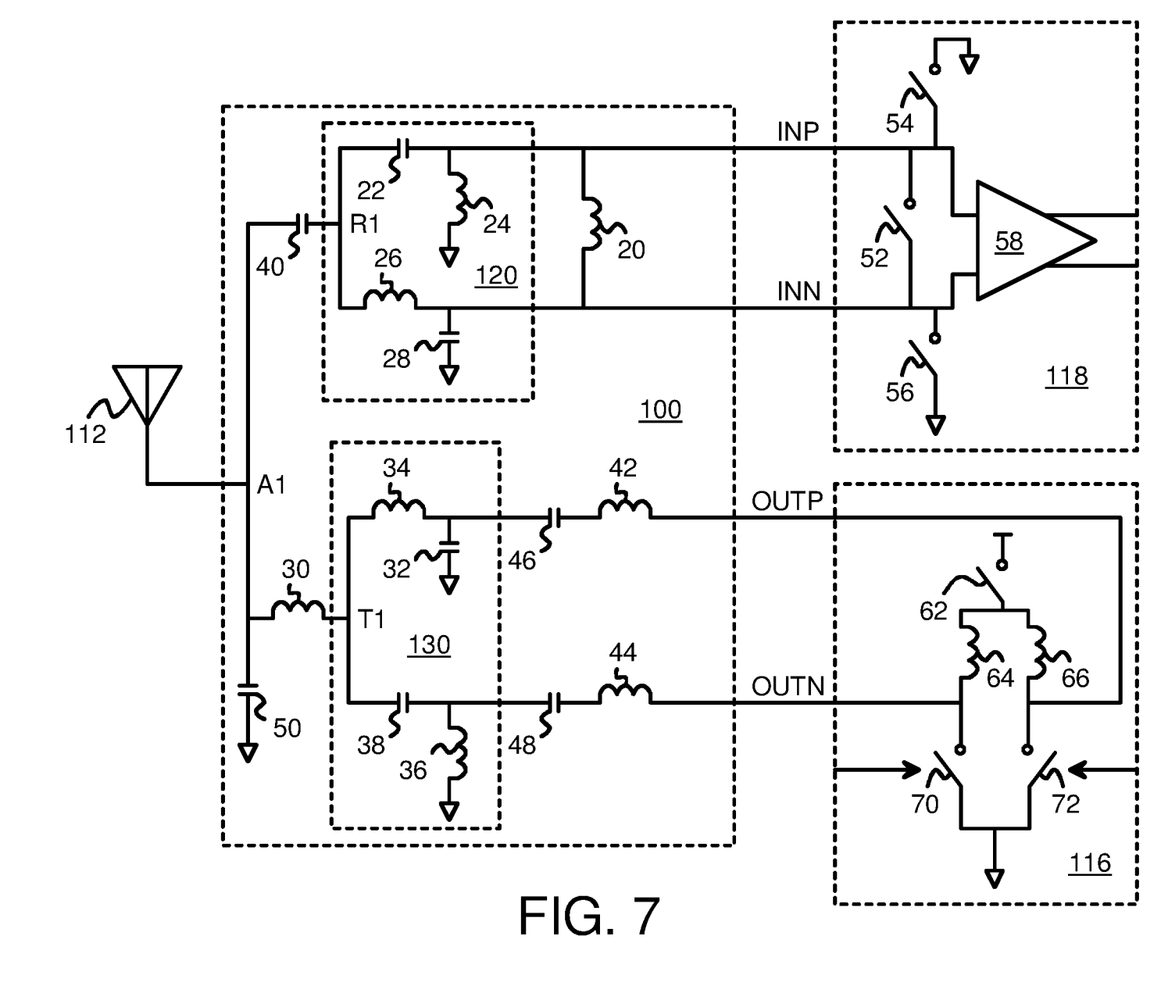
FIG. 7 is an alternative embodiment of the transceiver.

FIG. 7 is an alternative embodiment of the transceiver. The transmitter filter of filter inductor 42 and filter capacitor 46 can be in series in the reverse sequence, where filter inductor 42 connects to OUTP rather than filter capacitor 46. Likewise, filter capacitor 48 connects to TX balun 130 while filter inductor 44 connects to OUTN. More complex filters could be substituted.

Alternate Embodiments

Several other embodiments are contemplated by the inventors. For example switches could be implemented as transistors, such as n-channel transistors, p-channel transistors, or as pass gates. Other components could be added at various nodes, such as additional capacitors, resistors, transistors, filters, switches, sensors, etc. Components such as differential amplifier 58 may be powered down when not in use. Other modes of operation are possible.

The resonant frequency determined by the capacitance and inductance values of series or parallel impedances do not have to exactly match the transmitter or receiver frequency. The high impedance presented by TX inductor 30 and TX blocking capacitor 50 is much greater than the low impedance through RX capacitor 40 into the receiver. This difference between high and low impedances can be several orders of magnitude, so that the transceiver can switch among several frequencies of operation.

The transmitter power output from power amplifier 116 may experience a small loss due to interference cancellation circuit 100, such as a 0.5 dB loss, as one simulated example. The loss in gain caused by interference cancellation circuit 100 in the receiver path can be 1.2 dB, as an example. An external TX/RX switch could have an insertion loss of 0.5 to 1 dB, but the external switch can add almost one dollar to the cost. Thus using parallel resonances to mimic the TX/RX external switch can reduce the cost and size, while achieving about the same insertion loss.

A switch-less transceiver can be realized without a mechanical switch, electromechanical switch, or transistor switch. Inductors and capacitors can be integrated with other electronics, such as in a semiconductor or Integrated Circuit (IC). Cost and size can be significantly reduced by integrating the switch function into the IC. Insertion loss due to the switch can be eliminated and replaced by losses within interference cancellation circuit 100 that are comparable.

The transmitter and receiver could operate at the same frequency, or could operate from a selection of available frequencies, such as determined by a protocol or standard. These frequencies are typically less than 1 Ghz, and in the RF range.

While a ground node has been described, the ground could be any fixed voltage, such as a mid-point or common-mode voltage in a dual-rail powered system with both positive and negative power supplies. Polarities could be reversed so that the higher voltage of a power supply is ground, and the lower or more negative voltage of the power supply is considered to be the power voltage. Other shifts or inversions are possible.

Various amplifier, op amp circuits, and power amplifier circuits and configurations may be used. A single capacitor may be implemented as several parallel capacitors, and a variable capacitor may be implemented by a switched-capacitor array such as a binary-weighted capacitor array and a decoder.

Currents may be positive currents or negative currents and may flow in either direction, depending on the carrier polarity. Various theories of operation have been presented to help understand the operation of the system as best understood, but these theories are only approximations of actual circuit behavior and may be incorrect.

Additional components may be added at various nodes, such as resistors, capacitors, inductors, transistors, buffers, dividers, etc., and parasitic components may also be present. Enabling and disabling the circuit could be accomplished with additional transistors or in other ways. Pass-gate transistors or transmission gates could be added for isolation. Inversions may be added, or extra buffering. Separate power supplies and grounds may be used for some components. Various filters could be added. Active low rather than active high signals may be substituted. Various reference voltages or virtual supplies may be used rather than a hard ground.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications, applications, and variations are possible in light of the above teaching. It is intended that the scope of the invention be limited not by this detailed description, but rather by the claims appended hereto.

We claim:

1. A transceiver comprising:
    an antenna connection for connecting to an antenna, the antenna for both transmitting data and for receiving data;
    a receiver (RX) balun having an antenna input for receiving received data from the antenna, the RX balun having a differential receive output, the RX balun converting a single-ended signal from the antenna input into a differential signal on the differential receive output;
    an amplifier that receives the differential receive output from the RX balun and generates a received signal output representing the received data;
    a power amplifier that receives data for transmission, the power amplifier generating a differential transmit output from the data for transmission;
    a transmitter (TX) balun for converting the differential transmit output to a single-ended transmit signal on a transmit node;
    a TX inductor connected between the transmit node of the TX balun and the antenna connection;
    a TX blocking capacitor connected between the antenna connection and a ground; and
    a series impedance path within the TX balun, that connects the transmit node to the ground when the transmitter is disabled;
    wherein when the transmit node is virtually grounded by the series impedance path when the transmitter is disabled, the TX inductor and the TX blocking capacitor form a parallel resonance having a high impedance at a frequency of received data received by the antenna,
    whereby the parallel resonance isolates the received data on the antenna connection from the TX balun.

2. The transceiver of claim 1 wherein the series impedance path comprises:
    a TX balun series inductor connected between a first differential input of the TX balun and the transmit node;
    a TX balun grounding capacitor connected between the first differential input of the TX balun and the ground.

3. The transceiver of claim 2 wherein the series impedance path further comprises:
    a TX balun series capacitor connected between a second differential input of the TX balun and the transmit node;
    a TX balun grounding inductor connected between the second differential input of the TX balun and the ground.

4. The transceiver of claim 3 further comprising:
    a first filter coupled between a first differential output of the differential transmit output and the first differential input of the TX balun, the first filter having a filter inductor and a filter capacitor in series; and
    a second filter coupled between a second differential output of the differential transmit output and the second differential input of the TX balun, the second filter having a filter inductor and a filter capacitor in series.

5. The transceiver of claim 3 wherein the TX balun series inductor has a first inductance value and the TX balun grounding capacitor has a first capacitance value;
    wherein the first inductance value multiplied by the first capacitance value represents a resonant frequency that is within one order or magnitude to a receiver frequency carrying the received data;
    wherein the TX balun series inductor and the TX balun grounding capacitor resonate at the resonant frequency that is within an order of magnitude of the receiver frequency;
    wherein the parallel resonance of the TX balun series inductor and the TX balun grounding capacitor resonate at the resonant frequency to generate the high impedance to reduce signal loss at the receiver frequency during data reception.

6. The transceiver of claim 5 wherein the antenna transmits and receives Radio Frequency (RF) signals.

7. The transceiver of claim 1 wherein the RX balun further comprises:
    a RX balun series capacitor connected between the antenna input and a first differential receive output of the differential receive output to the amplifier;
    a RX balun grounding inductor connected between the first differential receive output and the ground;
    a RX balun series inductor connected between the antenna input and a second differential receive output of the differential receive output to the amplifier; and
    a RX balun grounding capacitor connected between the second differential receive output and the ground.

8. The transceiver of claim 7 wherein the RX balun series capacitor and the RX balun grounding inductor form a first series impedance from the antenna input to the ground;
    wherein the RX balun series inductor and the RX balun grounding capacitor form a second series impedance from the antenna input to the ground;
    wherein the first series impedance and the second series impedance together form a second parallel resonance;

wherein the second parallel resonance causes a high impedance at the antenna input when the receiver is disabled.

9. The transceiver of claim 8 wherein the RX balun series capacitor, RX balun grounding inductor, RX balun series inductor, and RX balun grounding capacitor have capacitance and inductance values that cause resonance within one order of magnitude of a transmit frequency for data transmitted by the antenna when the receiver is disabled.

10. The transceiver of claim 9 further comprising:
an equalizing switch connected between the first differential receive output and the second differential receive output;
a first disabling switch connected between the first differential receive output and the ground;
a second disabling switch connected between the second differential receive output and the ground;
wherein the receiver is disabled by closing the equalizing switch, the first disabling switch, and the second disabling switch, to ground the first differential receive output and the second differential receive output of the RX balun.

11. The transceiver of claim 10 further comprising:
an equalizing inductor connected between the first differential receive output and the second differential receive output.

12. The transceiver of claim 10 further comprising:
a RX capacitor connected between the antenna connection and the antenna input to the RX balun.

13. A switchless transceiver comprising:
an antenna node for connecting to an antenna for both transmitting (TX) and receiving (RX) at a transceiver frequency;
a TX inductor connected between the antenna node and a transmit node;
a TX blocking capacitor connected between the antenna node and a fixed voltage;
a TX balun that converts a differential TX signal on a first TX input and a second TX input to a single-ended TX signal on the transmit node;
a RX capacitor connected between the antenna node and a receive node;
a RX balun that converts a single-ended RX signal on the receive node to a differential RX signal on a first RX input and a second RX input;
a low-noise amplifier that amplifies a difference between the first RX input and the second RX input from the RX balun to generate a received data output that represents data received by the antenna;
a series impedance path in the TX balun between the transmit node and the fixed voltage, the series impedance path having a low impedance at the transceiver frequency, the series impedance path having a TX balun capacitor and a TX balun inductor in series that have capacitance and inductance values causing resonance at the transceiver frequency to generate the low impedance;
wherein the TX inductor and the TX blocking capacitor form a parallel resonance to the fixed voltage from the antenna node when data is not being transmitted, the TX inductor and the TX blocking capacitor having inductance and capacitance values causing resonance at the transceiver frequency that causes a high impedance between the antenna node and the TX balun.

14. The switchless transceiver of claim 13 wherein the TX balun capacitor is connected between the transmit node and the second TX input;

wherein the TX balun inductor is connected between the second TX input and the fixed voltage.

15. The switchless transceiver of claim 14 wherein the TX balun further comprises:
a TX balun series inductor connected between the transmit node and the first TX input;
a TX balun grounding capacitor connected between the first TX input and the fixed voltage.

16. The switchless transceiver of claim 15 further comprising:
a power amplifier that received TX data for transmission over the antenna to generate differential TX data on a first TX output and on a second TX output;
a first filter connected between the first TX output and the first TX input; and
a second filter connected between the second TX output and the second TX input.

17. The switchless transceiver of claim 16 wherein the first filter comprises a filter inductor and a filter capacitor in series;
wherein the first filter comprises a filter inductor and a filter capacitor in series.

18. The switchless transceiver of claim 15 wherein the RX balun further comprises:
a RX balun series capacitor connected between the receive node and the first RX input;
a RX balun grounding inductor connected between the receive node and the fixed voltage;
a RX balun series inductor connected between the receive node and the second RX input; and
a RX balun grounding capacitor connected between the receive node and the fixed voltage.

19. The switchless transceiver of claim 15 wherein the fixed voltage is a ground.

20. A parallel-impedance-switched transceiver comprising:
an antenna node for connecting to an antenna that both receives and transmits data;
a receiver (RX) capacitor connected between the antenna node and a receive node;
a RX balun series capacitor connected between the receive node and a positive differential RX input;
a RX balun grounding inductor connected between the positive differential RX input and a ground;
a RX balun series inductor connected between the receive node and a negative differential RX input;
a RX balun grounding capacitor connected between the negative differential RX input and the ground;
a differential receiver that receives the positive differential RX input and the negative differential RX input and outputs received data;
receiver enable switches that drives the positive differential RX input and the negative differential RX input to the ground when the receiver is disabled;
a transmitter (TX) blocking capacitor connected between the antenna node and the ground;
a TX inductor connected between the antenna node and a transmit node;
a TX balun series inductor connected between the transmit node and a positive filter node;
a TX balun grounding capacitor connected between the positive filter node and the ground;
a first filter connected between the positive filter node and a positive differential TX output, wherein the first filter comprises a first capacitor and a first inductor in series;
a TX balun series capacitor connected between the transmit node and a negative filter node;

a TX balun grounding inductor connected between the negative filter node and the ground;
a second filter connected between the negative filter node and a negative differential TX output, wherein the second filter comprises a second capacitor and a second inductor in series;
a power amplifier that drives the positive differential TX output and the negative differential TX output with differential data for transmission; and
a disabling switch in the power amplifier that disables the power amplifier from driving the positive differential TX output and the negative differential TX output when the transmitter is disabled.

\* \* \* \* \*